(12) United States Patent
Repetto et al.

(10) Patent No.: US 7,724,212 B2
(45) Date of Patent: May 25, 2010

(54) LUMINOUS DISPLAY FOR AUTOMOTIVE SATELLITE NAVIGATION SYSTEMS

(75) Inventors: Piermario Repetto, Orbassano (IT); Denis Bollea, Orbassano (IT); Stefano Bernard, Orbassano (IT); Cosimo Carvignese, Orbassano (IT); Roberto Finizio, Orbassano (IT); Luca Liotti, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 697 days.

(21) Appl. No.: 11/675,248

(22) Filed: Feb. 15, 2007

(65) Prior Publication Data

US 2007/0188409 A1      Aug. 16, 2007

(30) Foreign Application Priority Data

Feb. 15, 2006    (EP) .................................. 06425092

(51) Int. Cl.
  *G09G 3/04* (2006.01)
(52) U.S. Cl. .............................. 345/33; 345/30; 345/36; 345/39; 345/46
(58) Field of Classification Search ............. 345/30–50, 345/76–84; 710/207–212
   See application file for complete search history.

(56) References Cited

U.S. PATENT DOCUMENTS

| 5,115,398 | A | * | 5/1992 | De Jong | 701/200 |
| 5,243,528 | A | | 9/1993 | Lefebvre | 364/449 |
| 5,629,854 | A | * | 5/1997 | Schulte | 701/207 |
| 6,430,502 | B1 | * | 8/2002 | Pournain et al. | 701/211 |
| 6,812,888 | B2 | * | 11/2004 | Drury et al. | 342/357.13 |
| 2004/0104842 | A1 | * | 6/2004 | Drury et al. | 342/357.13 |

FOREIGN PATENT DOCUMENTS

| DE | 44 01 206 A1 | 7/1995 |
| DE | 103 29 504 A1 | 2/2005 |
| EP | 1 715 521 A1 | 10/2006 |
| EP | 1 715 522 A1 | 10/2006 |
| EP | 1 715 523 A1 | 10/2006 |

OTHER PUBLICATIONS

European Search Report for EP 06425092.1 dated Jul. 14, 2006.

* cited by examiner

*Primary Examiner*—Vijay Shankar
(74) *Attorney, Agent, or Firm*—Heslin Rothenberg Farley & Mesiti P.C.; Victor A. Cardona, Esq.

(57) ABSTRACT

A luminous display for automotive satellite navigation systems includes a panel equipped with light sources, for example made up of LEDs, arranged in a pre-ordered configuration of discrete segments, which can be combined with one another according to paths corresponding to the representation of a plurality of encoded generally arrow-shaped pictograms, each of which indicates a respective direction to follow indicated by the navigation system. The path to follow is highlighted with respect to possible alternative paths represented by the pictograms.

32 Claims, 10 Drawing Sheets

LUMINOUS DISPLAY FOR AUTOMOTIVE SATELLITE NAVIGATION SYSTEMS

CROSS REFERENCE TO RELATED APPLICATIONS

This application claims priority from European Patent Application No. 06425092.1, filed on Feb. 15, 2006, the entire disclosure of which is incorporated herein by reference.

FIELD OF THE INVENTION

The present invention relates in general to satellite navigation systems installed on board motor vehicles, and regards in particular to a luminous display for said navigation systems.

As is known, current motor vehicles are equipped with a wide range of devices for the presentation of information to the driver and/or to the passengers. The number and the information content of said devices has grown constantly over the years on account of the growing information content coming from vehicle systems.

Displays for applications on motor vehicles are generally classified in the following categories:

displays arranged on the on-board control or instrument panel, in front of the driver; these comprise:

backlighted icons for signalling information corresponding to the state of the vehicle (for example: handbrake, direction indicator, headlights, diagnostics for front and rear lights, foglights, rear foglights, engine-oil temperature, parking brake);

analogical dials for indication of the fuel level, engine r.p.m., vehicle speed, time, etc.;

backlighted liquid-crystal displays, for alphanumeric information (total mileage, partial mileage, etc.); and backlighted liquid-crystal displays of the dot-matrix type for returning information coming from the computer body (for example, average speed, average and instantaneous consumption, operating range, etc.);

displays located at the centre of the dashboard, in the area half-way between the driver and the passenger; these typically comprise:

backlighted liquid crystal displays of the active-matrix type for display of information coming from the GPS navigator (medium-to-high range), including indications and maps; the same display is typically used for presenting additional information (air-conditioner, radio/CD, telephone, info-telematics, cruising information coming from the computer body, etc.); and as an alternative to the foregoing, backlighted liquid-crystal displays of the passive-matrix type with medium-to-low information content, for display of information coming from the GPS navigator (low range), with the exclusion of maps; and displays located on the windscreen or on a viewer set between the driver and the windscreen; these displays are known by the term head-up displays (HUDs) and offer the possibility of returning the information in the following modes:

superimposed on the background, at the periphery of the field of view of the driver, whilst the latter performs the primary task of driving; this reduces the movement of the eyes/head necessary for the driver to gain access to the visual information and hence the time during which the driver's gaze is distracted from the road;

at a certain distance from the driver, typically ranging from two metres to infinity, so that the driver does not have to adapt the focal distance of his eye to gain access to the information.

HUDs are typically used for returning information corresponding to navigation, or information that is critical for vehicle safety.

STATE OF THE PRIOR ART

Luminous displays for automotive navigation systems traditionally consist of a panel located on board the vehicle in a way that is directly visible by the driver, said panel being, for example, of the liquid-crystal display (LCD) type, or of the vacuum-fluorescent display (VFD) type, or yet again of the inorganic-electroluminescent or thin-film-electroluminescent (TFEL) type, or of the organic light-emitting diode (OLED) type. In the case of LCDs, the luminous information to be returned to the user is obtained by backlighting the panel and rendering different areas of the panel selectively transparent or opaque. The LCDs may be low-resolution ones (for example, of the type with seven segments or alphanumeric type), medium-resolution ones (of the dot-matrix type, with a number of pixels indicatively lower than 100,000), or high-resolution ones (with a number of pixels indicatively higher than 100,000, typically of the active type, i.e., coupled to a matrix of thin-film transistors—TFTs).

In displays of the VFD, TFEL or OLED types, the luminous information is instead obtained by directly illuminating selected areas of the panel, without any need for backlighters. VFD technology typically does not enable display of medium-to-high resolution, whereas this is possible for TFEL and OLED technologies, albeit with costs that are significantly higher as compared to LCDs.

The luminous indications regarding the direction to follow can be of various nature, but generally consist of typically arrow-shaped encoded pictograms, provided in a plurality of linear configurations or/and encoded curves, each of which indicates a specific instruction such as, for example, "straight ahead", "turn left", "turn right", "turn round", etc.

Figure 12A:
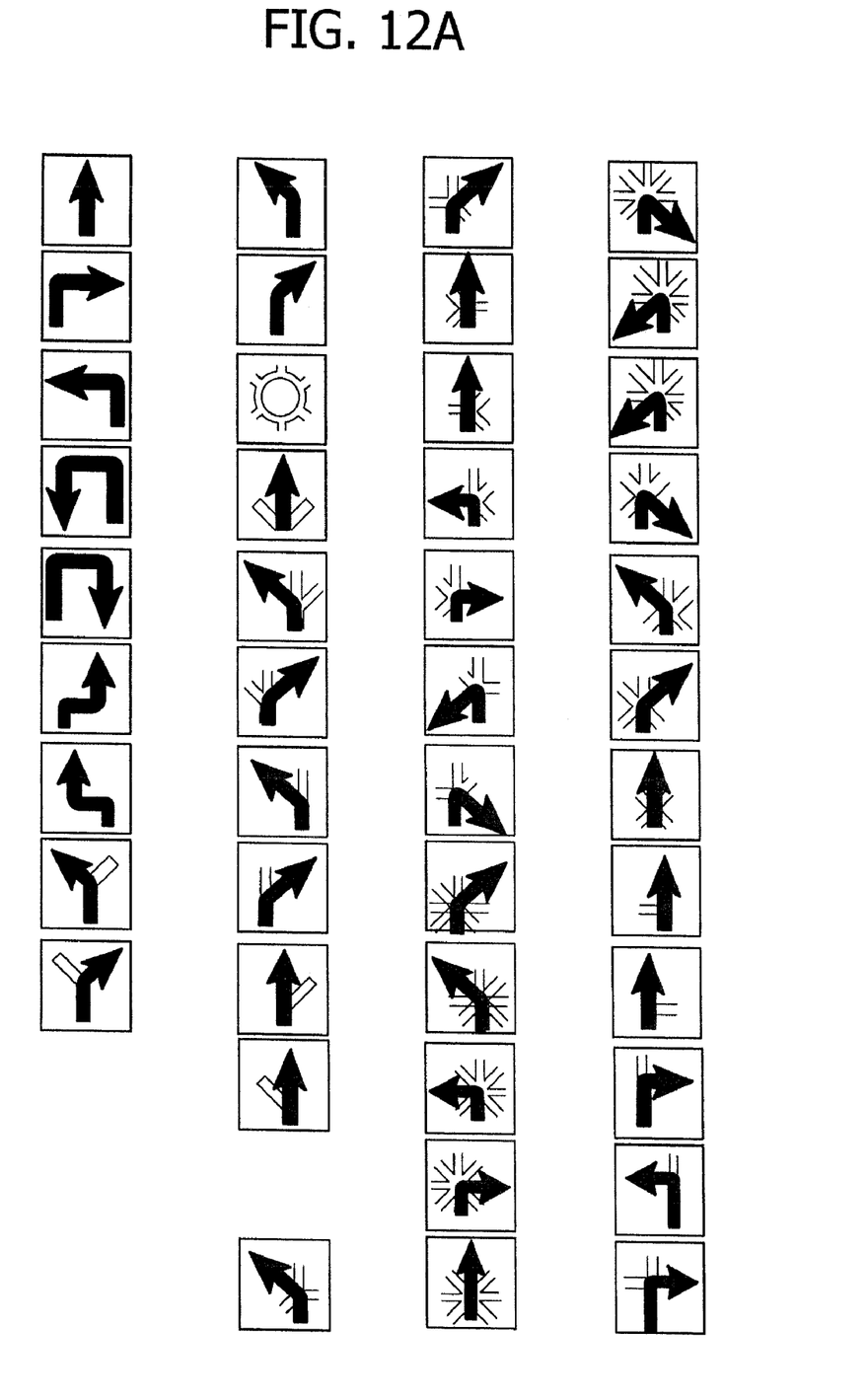
FIGS. 12A and 12B exemplify a series of different pictograms displayed by the display according to the invention.
Figure 12B:
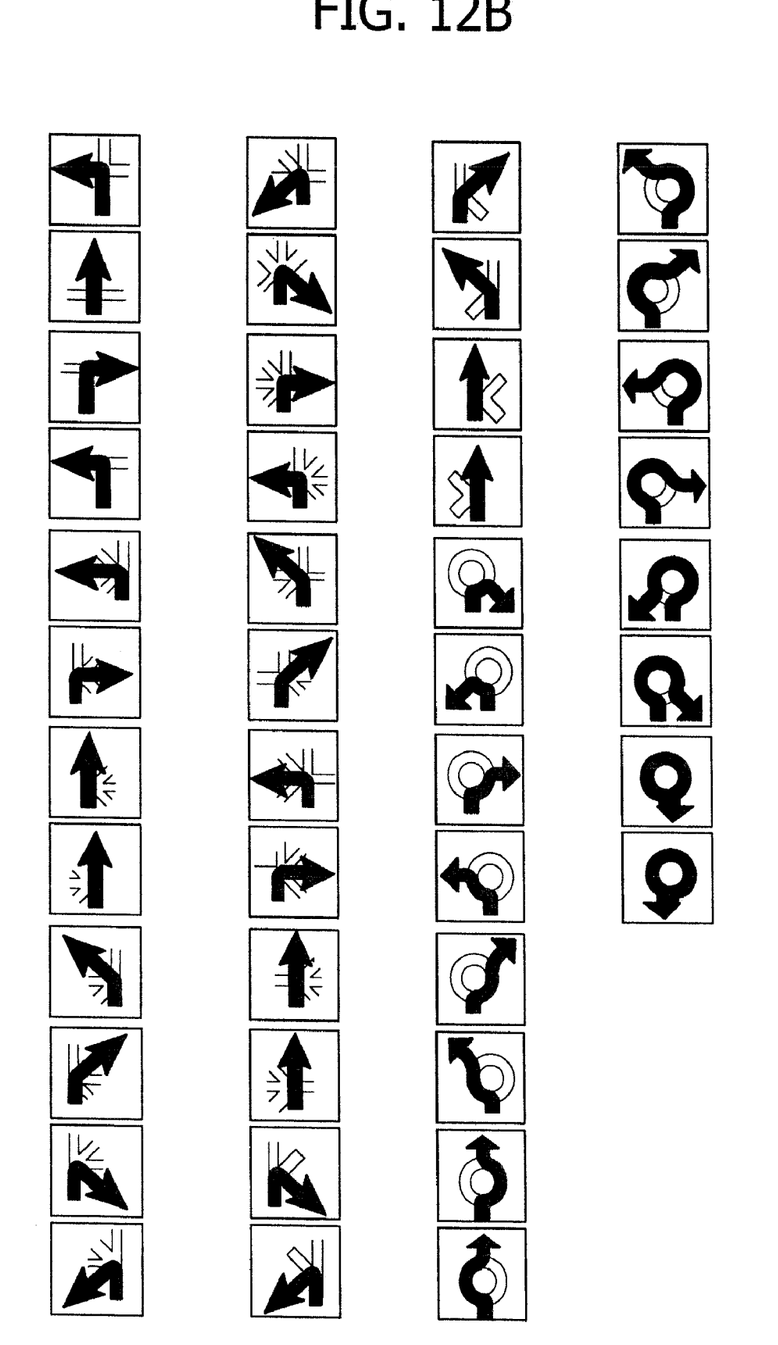

Such pictograms are exemplified in FIGS. 12A and 12B of the annexed plate of drawings: as may be seen, they are for the most part configured in such a way as to represent, in addition to the correct direction to follow to reach the pre-set destination, also alternative directions or paths—where these exist—which differ from the correct one and must hence be avoided.

Traditionally, for a luminous representation of the above information dot-matrix LCDs are used in order to guarantee a sufficient graphic quality of the pictograms. Lower-resolution LCDs, for example of the alphanumeric type (made, for instance, with a 5×7-pixel matrix for each character) typically enable only some of the pictograms (for example, the first 11 of the ones represented in the figures) to be represented, with a decidedly poorer graphic quality. Displays of a dot-matrix type, however, entail the use of a significant number of pixels, with rather high associated costs. In a typical configuration, the matrix is made up of 124×174 pixels, for a total of 21576 pixels.

SUMMARY OF THE INVENTION

The purpose of the present invention is to overcome the aforesaid drawback and to provide a luminous display of the type defined above, which will be able to present all the arrow-shaped pictograms normally envisaged for the instructions supplied by the satellite navigator with a graphic quality comparable to that of a display of a dot-matrix type, but with a decidedly lower number of pixels, so as to prove appreciably simpler and economically advantageous.

According to the invention, the above purpose is achieved thanks to the characteristics defined in claim 1.

The use of a small number of pixels, made possible by the present invention, likewise enables use of the light-emitting diode (LED) technology, i.e., integration of discrete elements of the LED type on one or more substrates to provide the individual pixels. This solution presents significant advantages in terms of efficiency and luminance, but cannot be adopted for solutions of a dot-matrix type with a number of pixels higher than some thousands, on account of the high costs of LED sources, long production times (the process of mounting of the LEDs is a serial process), and low production yields.

The use of LED sources in the form of chips, i.e., of semiconductors without package, as in the European patent applications Nos. EP-05425256.4, EP-05425255.6 and EP-05425254.9 (not published at the date of priority of the present application) in the name of the present applicant, also enables provision of transparent displays to be used in a way similar to HUDs.

According to a preferred embodiment of the invention, the aforesaid pre-ordered configuration comprises a plurality of rectilinear segments with a vertical, horizontal and oblique arrangement, and a central circular segment.

The light sources are conveniently supplied in such a way that the luminance of the segments that indicate the path to follow differs from the luminance of the segments associated to possible different paths.

Alternatively, the light sources can be arranged in such a way that the colour of the segments indicating the path to follow will differ from the colour of the segments associated to possible different paths.

In any case, the segments along which the light sources are arranged can be activated either completely or just partially and can hence be combined with one another in order to highlight the path to follow with respect to possible alternative paths represented by the pictograms. In any case, the element (or further element) that distinguishes the path to follow with respect to alternative paths consists in the activation of the corresponding arrow-headed terminal.

The light sources are preferably made up of LEDs, for example in the form of chips, or else can be formed by elements made of photoluminescent or electroluminescent material, deposited in a continuous or discrete way on the panel of the display.

The LEDs can be monochromatic ones, two-coloured or even multicoloured, and each of the segments defined thereby can comprise a single row or else two or even more rows of LEDs set alongside one another.

The LEDs can be arranged on a single substrate that is conveniently transparent, or else on two or more substrates set on top of one another which are also conveniently transparent, so as to split up their distribution. The LEDs can be, for example, grouped together in sets and controlled in an independent way by a dedicated electronics, interlocked to the navigation system.

In the case of the preferred pre-ordered configuration, which will be described in detail in what follows, the number of LEDs necessary for display of all the possible necessary arrow-shaped pictograms (approximately 90) is roughly 220. This results in a drastic reduction, also in terms of costs and of complexity of production, as compared to conventional dot-matrix displays.

With the arrangement according to the invention, the density of LEDs provided on the panel of the display will be such as to guarantee, at a distance of approximately one metre, an almost continuous visual perception of the segments. However, the number of LEDs can be further decreased by increasing their relative distance and using, for example, reflecting and/or micro-optical paths designed to maintain in any case a visual appearance of the segments that is substantially continuous.

BRIEF DESCRIPTION OF THE DRAWINGS

The invention will now be described in detail with reference to the annexed plate of drawings, which are provided purely by way of non-limiting example, and in which.

DETAILED DESCRIPTION OF THE INVENTION

Figure 1:
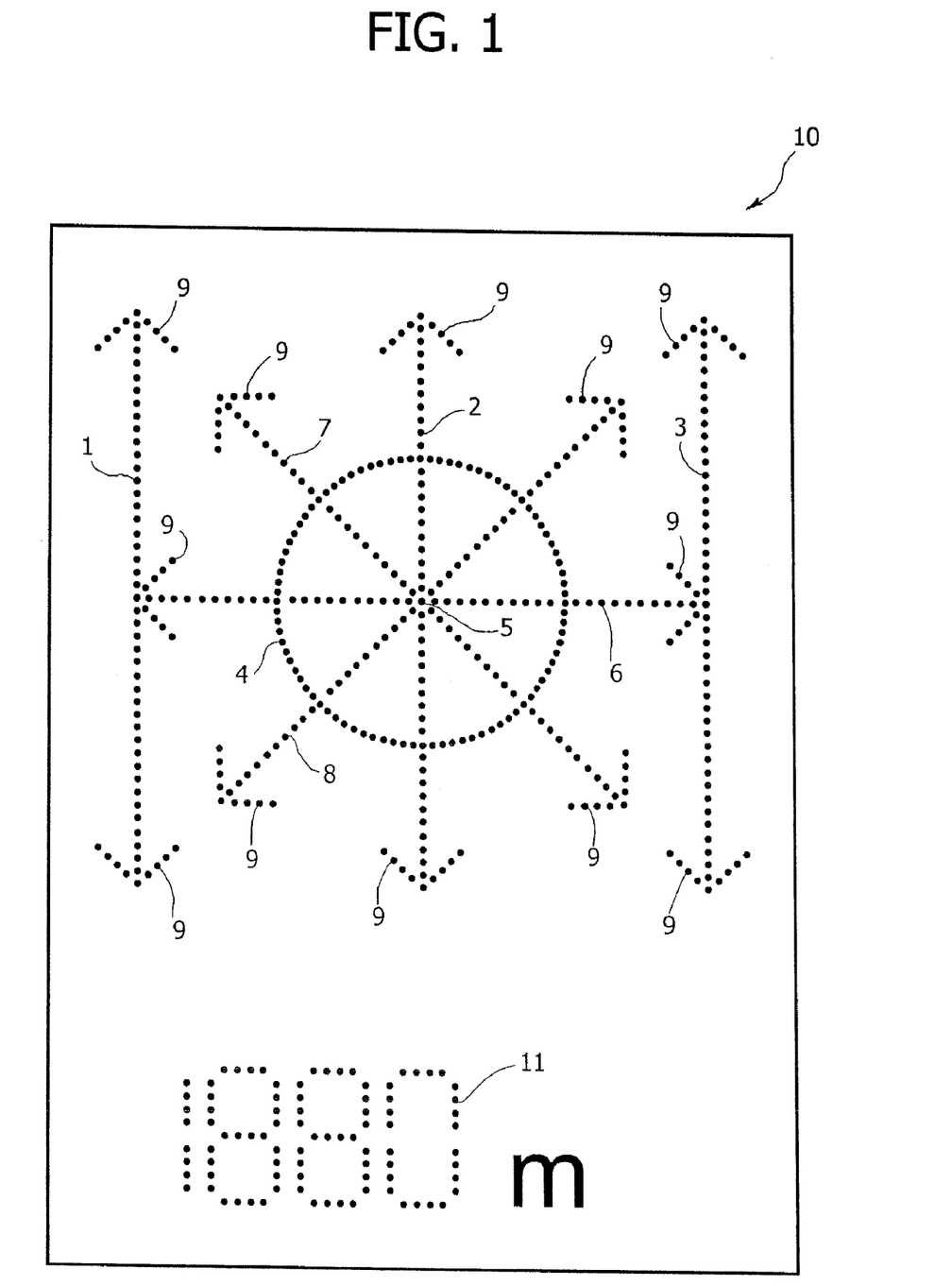
FIG. 1 is a schematic front elevation of a preferred embodiment of the luminous display according to the invention.

With initial reference to FIG. 1, a luminous display for automotive satellite navigation systems according to a first preferred embodiment of the invention basically comprises a panel, designated as a whole by 10, bearing selectively activatable light sources to represent in a luminous way a plurality of encoded pictograms, exemplified in FIGS. 12A and 12B, each of which represents a direction to follow indicated by the navigation system. As will be seen, said pictograms are generally linear, curved or broken-line arrows, according to an encoding representing almost all the possible manoeuvres that the driver of the vehicle on which the navigator is installed will have to perform to follow correctly the suggested itinerary towards the pre-set destination.

As may be seen from FIGS. 12A and 12B, the pictograms are for the most part configured in such a way as to represent, in addition to the correct direction to follow in order to reach the pre-set destination, also alternative directions or paths, when present, that differ from the correct direction and that will hence have to be avoided. For example, the eighth pictogram of the first column on the left in FIG. 12A indicates the need to turn left avoiding the turn to the right, and likewise the ninth pictogram of the same column indicates the need to turn right avoiding the turn to the left.

The panel 10 of the display, which as will be seen can be formed by a single or multiple substrate, is conveniently—but not necessarily—transparent, to enable use thereof with a modality of a "head-up" type, i.e., so as to be superimposed on the driver's view.

According to the fundamental characteristic of the invention, the light sources applied on the panel 10 of the display are in an appreciably reduced number as compared with the ones normally used in conventional dot-matrix displays, and are arranged according to a pre-ordered configuration of discrete segments, conveniently according to the one represented in FIG. 1. In said figure, the light sources, represented by dots, consist of LEDs, for example in the form of chips, i.e., of semiconductors without package, or alternatively already provided with package (for example of the SMD type). The LEDs in the form of chips can be integrated in a substrate through technologies of the "chip-on-board" or "chip-on-glass" type.

The light sources may include, as an alternative or in addition to the LEDs, elements made of photoluminescent or electroluminescent materials, deposited continuously or in the form of dashes or dots on the panel 10.

According to the configuration represented in FIG. 1, the segments along which the LEDs (or the equivalent light sources) are arranged comprise: a set of three vertical segments 1, 2, 3 set at equal distances apart; a circular segment 4, which is centred on the centre line 5 of the central vertical segment 2 and the radius of which is approximately half the distance between said central vertical segment 2 and each of the other vertical segments 1, 3; and a horizontal segment 6, which extends between the vertical segments 1 and 3 and is centred on the centre line 5 of the central vertical segment 2. The configuration moreover comprises a pair of mutually orthogonal oblique segments 7, 8, which also pass through the centre line 5 of the central vertical segment 2 and are arranged at 45° with respect thereto.

In a preferred embodiment, each of the segments, whether vertical 1, 2, 3, horizontal 6, or oblique 7, 8, is coupled on its respective end to an arrangement of LEDs shaped like an arrow head 9.

Figure 2:
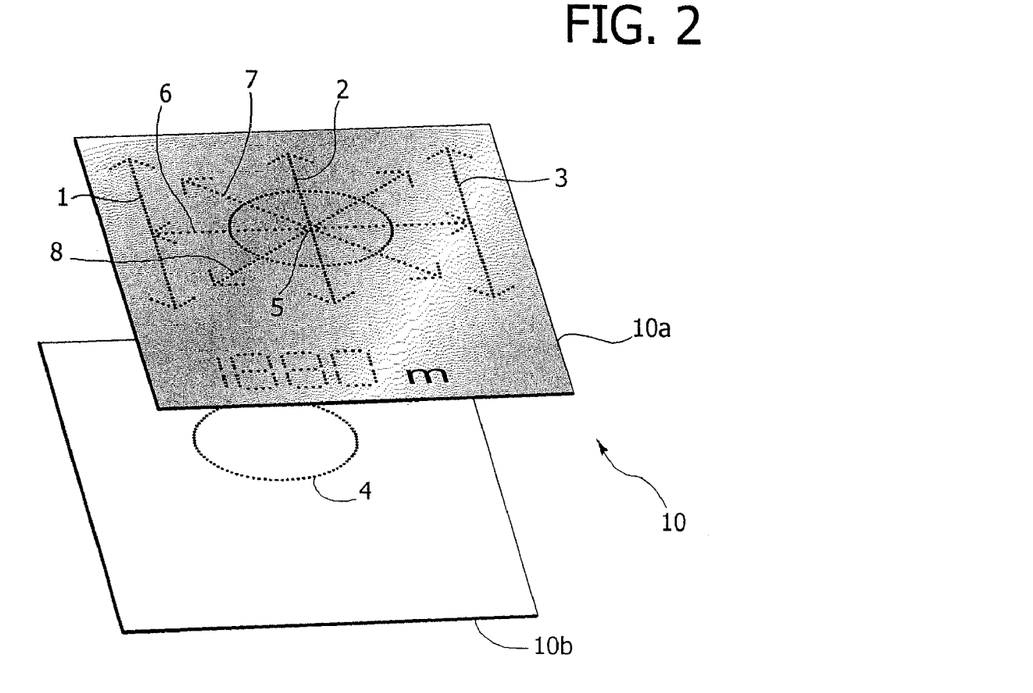
FIG. 2 is an exploded perspective view at a reduced scale of the display of FIG. 1.

As mentioned previously, the LEDs arranged according to the segments described above can be applied to a single substrate, and in this case the panel 10 will be single-layer, or else can be distributed on one pair (or a number of pairs) of substrates 10a, 10b superimposed on one another, in the way represented in FIG. 2. In this case, the LEDs may be shared between the two substrate 10a, 10b so as to simplify the distribution of the corresponding conductive paths. The example of FIG. 2 shows the case where the rectilinear segments 1, 2, 3, 6, 7 and 8 are applied to the front substrate 10a, and the circular segment 4 is applied to the back substrate 10b.

The LEDs of each segment can conveniently be operatively associated in sets, and in this case said sets will be controlled in an independent way by a dedicated electronic circuit, operatively connected to the navigation system.

In the case represented in FIGS. 1 and 2, each segment is formed by a single row of monochromatic LEDs.

Figure 3:
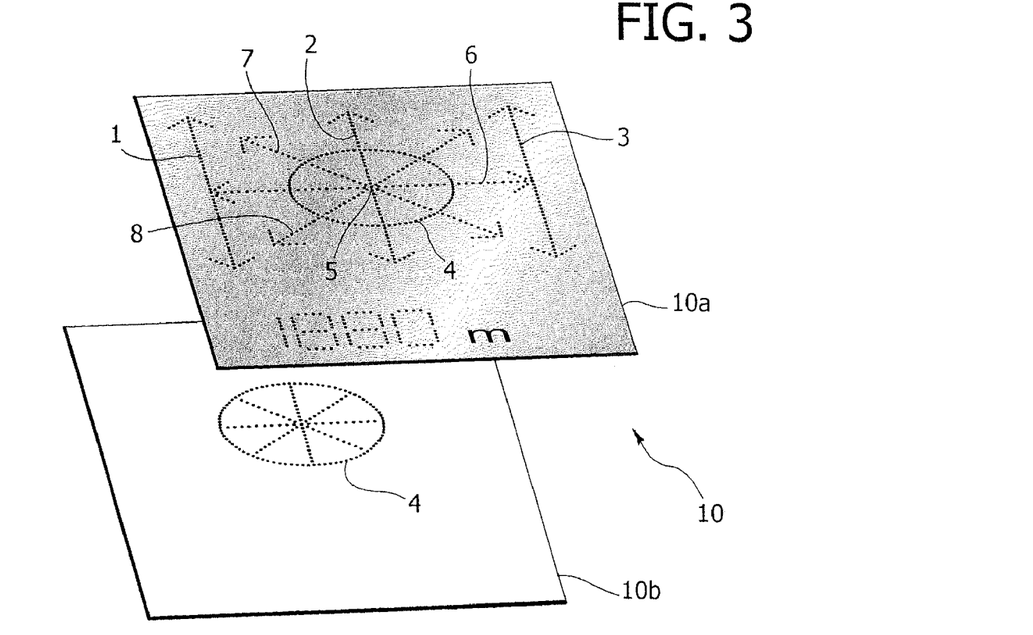
FIG. 3 shows a variant of the display of FIG. 2.

Alternatively, the LEDs can be either totally or in part two-coloured or multicoloured. In the example represented in FIG. 3, the LEDs of a first colour corresponding to all the segments of the configuration are carried by the front substrate 10a, whilst the back substrate 10b bears the LEDs of a second colour corresponding to the circular segment 4 and to the portions of the segments 2, 6, 7 and 8 arranged within said circular segment 4.

In operation, selective activation of the LEDs along the various segments 1, 2, 3, 4, 6, 7, 8 (either all of them or only some of them) enables, via the possible combinations, display of the corresponding pictogram in such a way as to highlight the path to follow represented thereby with respect to one or more alternative paths possibly associated to said pictogram.

In particular, the two-colour or multicolour solution enables presentation to the user both of the correct path to follow and of possible alternative paths, in a differentiated way and such that said path to follow will be distinguishable from said alternative paths thanks to a different colouring. In the case of a monochromatic solution, the same effect can be achieved by using different levels of luminance for the segments associated to the path to follow and for the segments associated to alternative paths, the latter being typically at a lower luminance.

Another possible alternative, described hereinafter, enables the correct path to be highlighted with respect to the possible alternative paths through a different "thickness" of the segments (or parts thereof) that define the pictogram displayed.

In all cases, the further element that distinguishes the path to follow from alternative paths is represented by the element with the terminal arrow 9.

Figure 4:
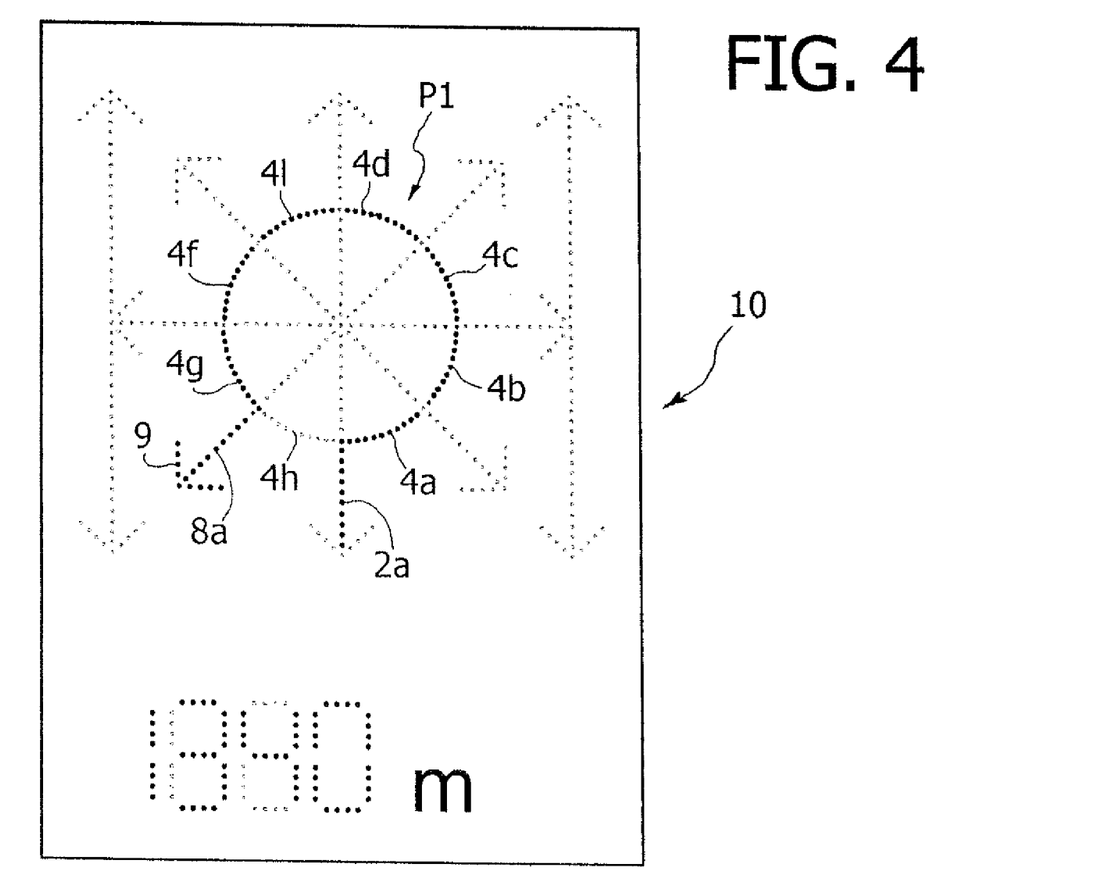
FIGS. 4, 5A-5B, 6 and 7 are views similar to that of FIG. 1 which exemplify some of the luminous representations that can be made available by the display.
Figure 5A:
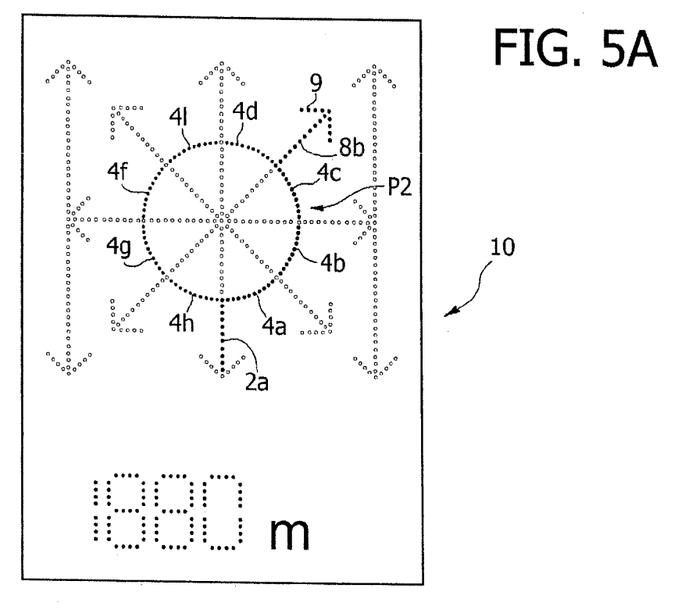
Figure 5B:
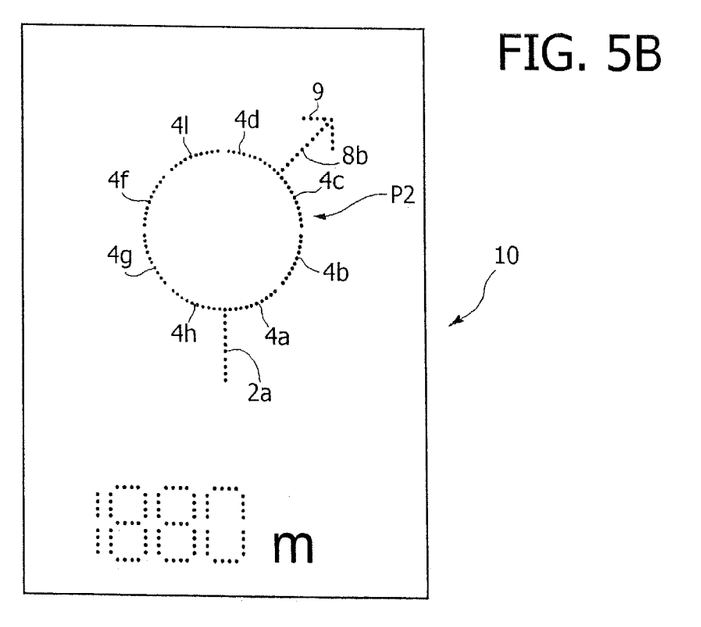
Figure 6:
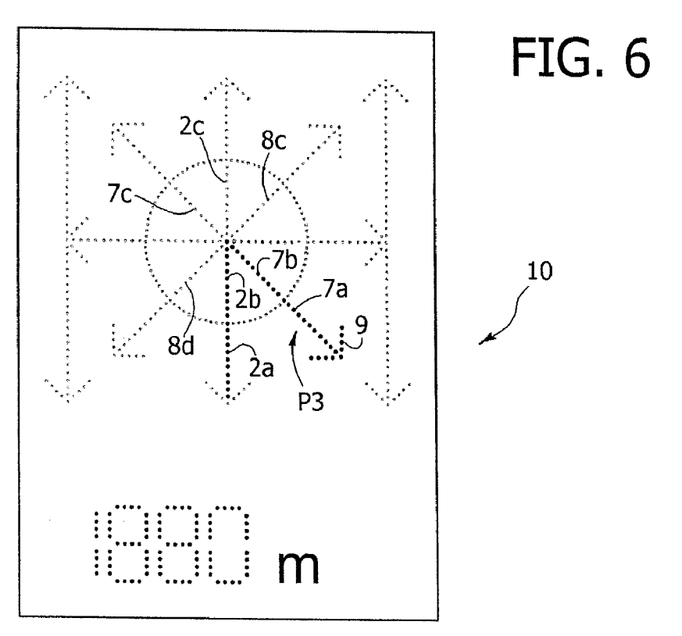
Figure 7:
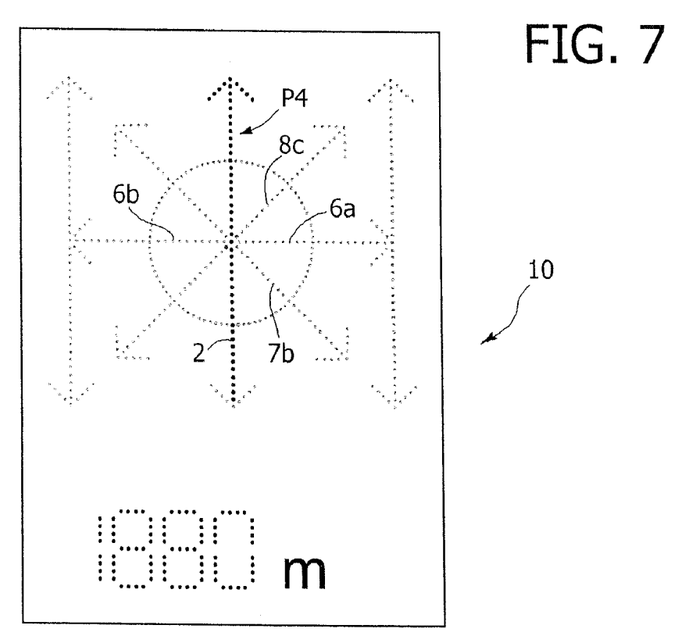

Examples of displays in which the correct path is highlighted with a different colour or a higher luminance from alternative paths are illustrated in FIGS. 4-9. In particular:

in FIG. 4, the correct path of the pictogram P1, corresponding to the instruction "enter the roundabout and leave it to the south-west", is highlighted (by a different colour or a higher luminance of the portion 2a of the central vertical segment 2, of the portions 4a-4g of the circular segment 4 and of the portion 8a of the oblique segment 8 with the corresponding arrow head 9) with respect to the alternative path, which is wrong, represented by the portion 4h of the circular segment 4; the other segments or parts thereof obviously remain off;

in FIG. 5A the correct path of the pictogram P2, corresponding to the instruction "enter the roundabout and leave it to the north-east", is highlighted (for example by a different colour or a higher luminance of the portion 2a of the central vertical segment 2, of the portions 4a-4c of the circular segment 4 and of the portion 8b of the oblique segment 8, with the corresponding arrow head 9) with respect to the alternative path, which is wrong, represented by the portions 4d-4h of the circular segment 4; FIG. 5B shows the same representation as that of FIG. 5A, in which, however, all the other segments and parts thereof belonging to the pre-ordered configuration that do not contribute to displaying the pictogram P2, i.e., the LEDs of which remain off, are omitted; this corresponds to the image of the pictogram P2 as appears in actual fact to an observer;

in FIG. 6 the correct path of the pictogram P3, corresponding to the instruction "turn south-east at the intersection", is highlighted (for example by a different colour or a higher luminance of the portions 2a, 2b of the central vertical segment 2, and of the portions 7a, 7b of the oblique segment 7, with the corresponding arrow head 9) with respect to the alternative paths, which are wrong, represented by the portions 8c and 8d of the oblique segment 8, 2c of the central vertical segment 2, and of the portion 7c of the oblique segment 7; and in FIG. 7 the correct path of the pictogram P4, corresponding to the instruction "straight ahead", is highlighted (for example by a different colour or a higher luminance of the entire central vertical segment 2 with the corresponding arrow head 9) with respect to the alternative paths, which are wrong, represented by the portion 7b of the oblique segment 7, by the portions 6a and 6b of the horizontal segment 6, and by the portion 8c of the oblique segment 8.

The density of the LEDs along the different segments of the pre-ordered configuration will be such as to guarantee, at a distance of approximately one metre, an almost continuous perception of said segments. It is possible to reduce the number of LEDs by increasing their relative distance and using, for example, reflecting and/or optical paths so as to maintain in any case visual continuity of the segments.

With the arrangement described above there are, for example, used, for the normal dimensions of the panel of a display designed to be installed on board a vehicle, approximately 220 LEDs designed to enable, by means of a multiplicity of possible combinations, the representations of the arrow-shaped pictograms to be obtained, which, as has been said, are encoded in little less than 90 pictograms. The dimensions of each pictogram may be, for example, 25×25 mm. To increase the dimensions of the pictograms (the dimension will depend upon the distance of installation of the display with respect to the driver) the number of LEDs may be doubled so as to double also the overall dimensions of the pictograms, which will thus assume a value of approximately 50×50 mm.

In the case of two-coloured or multicoloured LEDs, the number of LEDs will be greater in so far as for some of the segments it will be necessary to double the number of LEDs.

In addition to the pre-ordered configuration for the representation of the pictograms, the display according to the invention can be conveniently equipped with a further set of LEDs with an arrangement with seven multiple segments, designated by 11, in order to indicate the distance to be covered associated to the information presented in the pictogram, for example, in the case of a turn, the distance to be covered before turning. The number of these LEDs may be comprised for example between 88 and 110, according to the size of the digits to be displayed.

Figure 8:
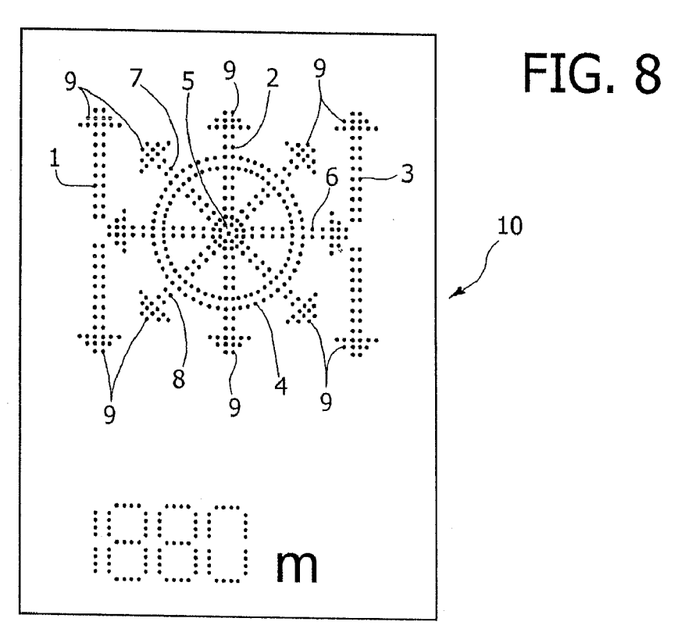
FIG. 8 is a view similar to that of FIG. 1, at a reduced scale, which shows a variant of the display.

According to the variant represented in FIG. 8, at least some of the vertical 1, 2 and 3, circular 4, horizontal 6 and oblique 7, 8 segments are formed, either totally or in part instead of by a single row of LEDs (or equivalent light sources), by two (or even more) rows set alongside one another. In the case where all the segments are formed by a double row of LEDs set alongside one another, approximately 450 of them will be necessary to enable, by their possible combinations, all the approximately 90 configurations of pictograms to be obtained. Also in this variant two-coloured or multicoloured LEDs may used. However, in order to limit their number, it is in this case more convenient to use monochromatic LEDs provided with different intensities.

Also in this case, the LEDs arranged according to the segments of the pre-ordered configuration described above may be provided on a single substrate or else on two or more substrates set on top of one another, possibly transparent, like the one described with reference to FIG. 2.

With the above arrangement, which as has been said envisages the individual segments 1, 2, 3, 4, 6, 7, and 8 to be made up by two (or even more) rows of light sources set alongside one another, it is possible to increase the effective "thickness" of the pictograms and at the same time obtain different possibilities of display of the information, as described hereinafter.

Figure 9:
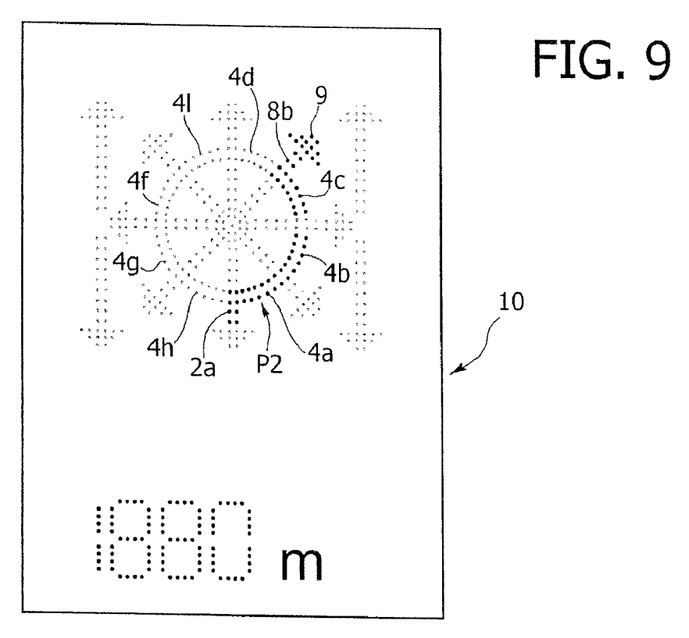
FIGS. 9 to 11 are views similar to that of FIG. 8 that show some luminous representations made available by the display according to FIG. 8.
Figure 10:
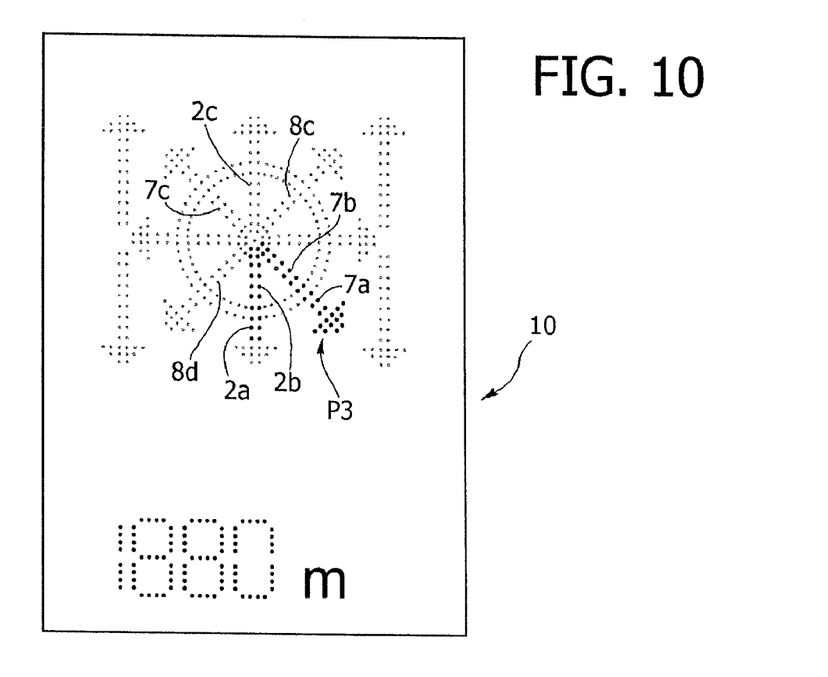
Figure 11:
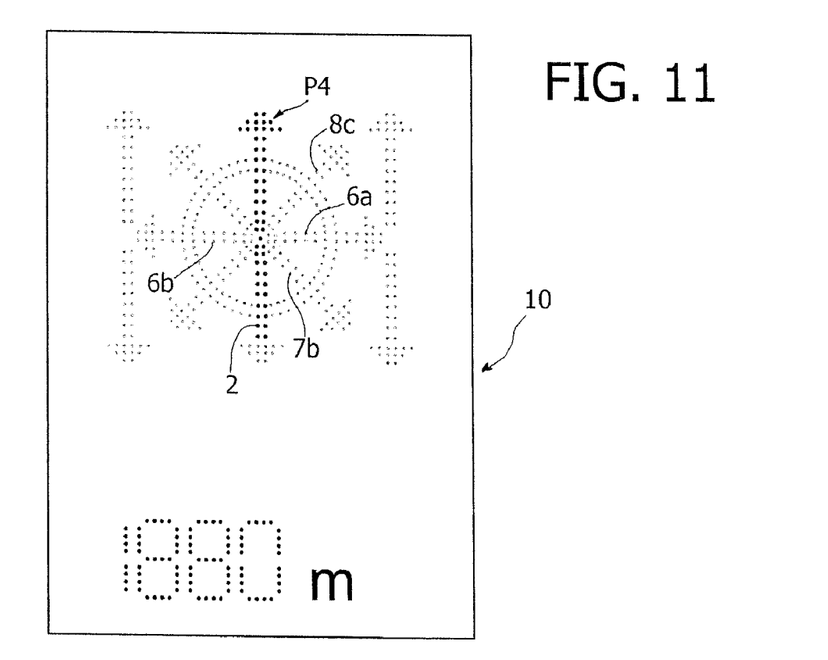

A first possibility envisages use of different levels of luminance to distinguish the path to follow from the alternative paths, and a second possibility envisages use of different colours to distinguish the path to follow from the alternative paths. Examples in this direction are represented in FIGS. 9, 10 and 11, which represent the pictograms P2, P3 and P4, corresponding to the ones of FIGS. 5, 6 and 7 respectively, but with an arrangement with a double row of LEDs. In particular:

in FIG. 9 the correct path of the pictogram P2, corresponding to the instruction "enter the roundabout and leave it to the north-east", is highlighted (for example by a different colour or a higher luminance of the portion 2a of the double central vertical segment 2, of the portions 4a-4c of the circular segment 4 and of the portion 8b of the oblique segment 8, with the corresponding arrow head 9) with respect to the alternative path, which is wrong, represented by the portions 4d-4h of the double circular segment 4; obviously, the other segments or parts thereof remain off;

in FIG. 10 the correct path of the pictogram P3, corresponding to the instruction "turn south-east at the intersection", is highlighted (for example by a different colour or a higher luminance of the portions 2a, 2b of the double central vertical segment 2, and of the portions 7a, 7b of the double oblique segment 7, with the corresponding arrow head 9) with respect to the alternative paths, which are wrong, represented by the portions 8c and 8d of the double oblique segment 8, 2c of the double central vertical segment 2, and of the portion 7c of the double oblique segment 7; and in FIG. 11 the correct path of the pictogram P4, corresponding to the instruction "straight ahead", is highlighted (for example by a different colour or a higher luminance of the entire double central vertical segment 2, with the corresponding arrow head 9) with respect to the alternative paths, which are wrong, represented by the portion 7b of the double oblique segment 7, by the portions 6a and 6b of the double horizontal segment 6, and by the portion 8c of the double oblique segment 8.

Figure 13:
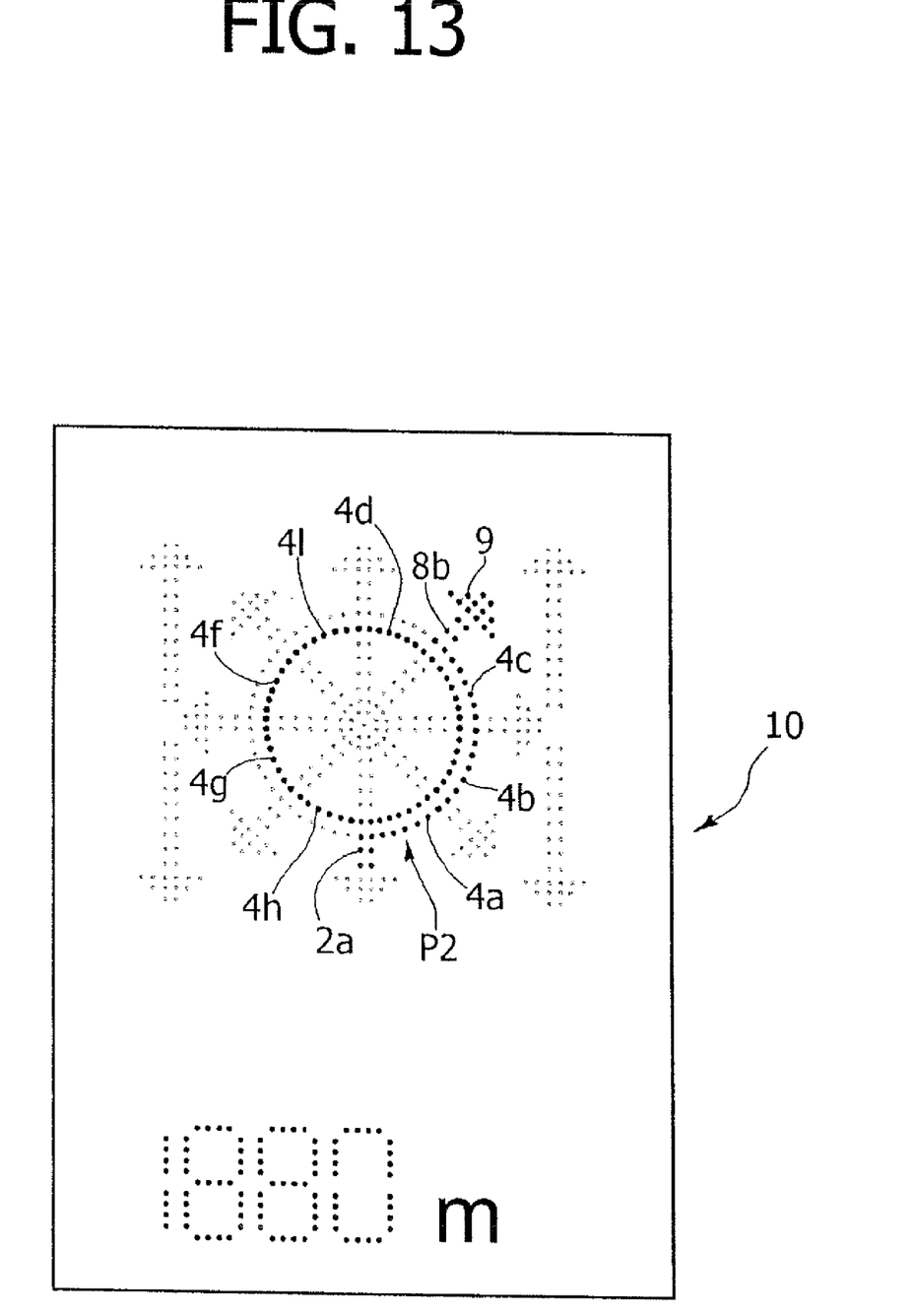
FIG. 13 is a view similar to that of FIG. 8, at a larger scale, which shows another possible variant of the display according to the invention.

A third possibility envisages use of the same level of luminance and the same colouring both for the path to follow and for possible alternative paths, but lighting up of a different number of rows of sources for each segment in such a way that the alternative path and the path to follow will have effective "thicknesses" that differ from one another. Said possibility is exemplified in FIG. 13, where the correct path of the pictogram P2, corresponding to the instruction "enter the roundabout and leave it to the north-east", is highlighted (thanks to the lighting-up of both of the rows of LEDs of the portion 2a of the double central vertical segment 2, of the portions 4a-4c of the circular segment 4, and of the portion 8b of the oblique segment 8, with the corresponding arrow head 9) with respect to the alternative path, which is wrong, represented by the portions 4d-4h of the double circular segment 4, in which a single row of LEDs is lit up.

According to further variants (not illustrated in the drawings), the display according to the invention can moreover comprise an indicator of the gear engaged and/or an indicator of the speed of the vehicle and/or at least one "warning" icon, for example corresponding to the fuel-level gauge, hazard lights activated, engine-oil temperature, or the like. In addition, the display can also include at least one region where the light sources are arranged in a configuration of a dot-matrix type for representing information in a reconfigurable way.

According to other variants, the panel of the display can be made of a flexible material and in this case it can be positioned between the two plates of glass forming the windscreen of the vehicle, or else glued on the surface of the windscreen inside the vehicle. Alternatively, the panel of the display can be positioned on the dashboard of the vehicle in front of the driver and in the proximity of the windscreen.

The panel of the display will be provided for receiving information from a satellite navigation system integrated in the vehicle or else from a portable satellite navigation system. The information can be transmitted in wireless mode, via radiofrequency or infrared.

Finally, it should be pointed out that the display can be supplied autonomously through a power-generation system located in the proximity of the corresponding panel.

Of course, the details of construction and the embodiments may vary widely with respect to what is described and illustrated herein, without thereby departing from the scope of the present invention, as defined in the ensuing claims.

What is claimed is:

1. A luminous display for automotive satellite navigation systems, comprising:

a panel equipped with selectively activatable light sources for representing a plurality of predetermined generally arrow-shaped pictograms, each of which indicates a respective direction to follow, indicated by the navigation system;

said pictograms being at least in part configured so as to represent a correct path to follow to reach a pre-set destination and possible alternative paths different from the correct path; and wherein said light sources are arranged in a pre-ordered configuration of discrete segments, which can be activated either entirely or partially and can be combined with one another according to paths corresponding to the representation of each of said pictograms, said light sources being arranged for highlighting the path to follow with respect to the alternative path or paths represented by said pictograms;

wherein said pre-ordered configuration comprises a set of three vertical segments set at equal distances apart, a circular segment centered on the center line of the central vertical segment of said set of three, a horizontal segment extending between the other two vertical segments of said set of three and passing through the center line of said central vertical segment, and a pair of mutually orthogonal oblique segments, which also pass through the center line of said central vertical segment and are arranged at 45° with respect to the latter, at least one of said vertical, horizontal and oblique segments, having an arrow-headed end.

2. The luminous display according to claim 1, wherein said segments are rectilinear.

3. The luminous display according to claim 1, wherein said light sources include LEDs.

4. The luminous display according to claim 1, wherein said light sources include elements made of photoluminescent or electroluminescent material.

5. The luminous display according to claim 4, wherein said elements made of photoluminescent or electroluminescent material are discrete or connected to one another in a continuous way.

6. The luminous display according to claim 3, wherein said LEDs are monochromatic.

7. The luminous display according to claim 1, wherein said light sources are supplied in such a way that the luminance of the segments that indicate the path to follow is different from the luminance of the segments associated to the possible alternative paths.

8. The luminous display according to claim 1, wherein said light sources are arranged in such a way that the colour of the segments that indicate the path to follow is different from by the colour of the segments associated to the possible alternative paths.

9. The luminous display according claim 1, wherein said panel is transparent.

10. The luminous display according to claim 1, wherein said light sources are grouped together on a single substrate.

11. The luminous display according to claim 1, wherein said light sources are distributed over at least two substrates set on top of one another.

12. The luminous display according to claim 1, wherein each of said segments comprises a single row of light sources.

13. The luminous display according to claim 1, wherein at least one of said segments comprises a double row of light sources.

14. The luminous display according to claim 1, further comprising an indicator with seven multiple segments of light sources for indication of the distance to be covered, said distance being associated to the pictogram presented.

15. The luminous display according to claim 1, wherein at least one of said segments is made up of at least two rows of sources set alongside one another.

16. The luminous display according to claim 15, wherein the segments associated to the alternative paths are displayed with the lighting-up of a number of said rows of sources set alongside one another different from the segments associated to the path to follow.

17. The luminous display according to claim 1, wherein the path to follow is distinguished from possible alternative paths by the presence of said arrow-headed end.

18. The luminous display according to claim 16, wherein the alternative path and the path to follow have the same level of luminance.

19. The luminous display according to claim 3, wherein said LEDs are in the form of "chips", i.e., of semiconductors without package.

20. The luminous display according to claim 19, wherein said LEDs in the form of chips are integrated in a substrate through technologies of the "chip-on-board" or "chip-on-glass" type.

21. The luminous display according to claim 1, further comprising an indicator of the gear engaged.

22. The luminous display according to claim 1, further comprising an indicator of the speed of the vehicle.

23. The luminous display according to claim 1, further comprising at least one "warning" icon, said icon corresponding to at least one of the fuel-level gauge, hazard lights activated, or engine-oil temperature.

24. The luminous display according to claim 1, further comprising at least one region where said light sources are arranged in a configuration of a dot-matrix type for representing information in a reconfigurable way.

25. The luminous display according to claim 9, wherein said panel is made of flexible material.

26. The luminous display according to claim 25, wherein at said panel made of flexible material is positioned between two plates of glass forming the windscreen of the vehicle.

27. The luminous display according to claim 25, wherein said panel made of flexible material is glued on the surface of the windscreen within the vehicle.

28. The luminous display according to claim 9, wherein said panel is positioned on the dashboard of the vehicle in front of the driver and in the proximity of the windscreen.

29. The luminous display according to claim 1, wherein said panel receives information from a satellite navigation system integrated in the vehicle.

30. The luminous display according to claim 1, wherein said panel receives information from a portable satellite navigation system.

31. The luminous display according to claim 29, wherein said information is transmitted in wireless mode, via radiofrequency or infrared.

32. The luminous display according to claim 31, wherein said display is supplied autonomously through a power-generation system located in the proximity of said panel.

* * * * *